INVENTOR.
J.W. BEGLEY

BY *Young & Quigg*

ATTORNEYS

United States Patent Office 3,284,525
Patented Nov. 8, 1966

3,284,525
HYDRODEALKYLATION PROCESS
John W. Begley, Bartlesville, Okla., assignor to Phillips Petroleum Company, a corporation of Delaware
Filed Aug. 20, 1962, Ser. No. 217,807
2 Claims. (Cl. 260—672)

This invention relates to an improved hydrodealkylation process and apparatus therefor. In another aspect, this invention relates to an improved hydrodealkylation process wherein the rate of carbon formation in the hydrodealkylation zone is substantially reduced. In yet another aspect, this invention relates to an improved hydrodealkylation reactor.

Conventionally, in the production of an aromatic hydrocarbon such as benzene from an alkyl aromatic hydrocarbon such as toluene, a vaporous toluene feed is passed through a thermal hydrodealkylation zone and contacted therein with hydrogen. A hydrodealkylation zone effluent is withdrawn, cooled and passed to a phase separation zone. A vaporous product comprising hydrogen is withdrawn from the phase separation zone and recycled to the hydrodealkylation zone. A liquid product comprising benzene and alkylbenzenes is withdrawn from the phase separation zone and passed to a conventional fractionation zone wherein the product benzene is separated from the alkylbenzenes.

In the thermal hydrodealkylation of toluene, it has been discovered that carbon is formed in the hydrodealkylation zone in the presence of iron, cobalt, nickel or an alloy of said metals and that the rate of carbon formation in the hydrodealkylation zone is increased after each successive carbon removal step wherein the carbon deposited in the hydrodealkylation zone is removed by the oxidation of the formed carbon. The metal present in the hydrodealkylation zone generally comprises the metal surface of the reaction chamber. The catalytic activity of the metal surface results in the formation of and deposition of carbon in the hydrodealkylation zone and the catalytic activity of the metal surface to form carbon is increased by the oxidation carbon removal step.

I have discovered that in passing a sulfur compound with the hydrodealkylation reactant materials to the thermal hydrodealkylation zone that the metal surface is passivated, thereby suppressing the carbon formation and deposition.

In thermal hydrodealkylation processes, it is economically desirable to operate at as low a hydrogen-hydrocarbon ratio in the hydrodealkylation zone as possible consistent with minimum carbon formation and deposition in the hydrodealkylation zone. The hydrogen is separated from the remainder of the hydrodealkylation zone effluent in the previously described manner and recycled to the hydrodealkylation zone. It can readily be seen that the cost of recovering and recycling the hydrogen is a substantial factor in determining the total cost of the hydrodealkylation process. Therefore, it is desirable to employ a hydrodealkylation reactor wherein the hydrogen to hydrocarbon ratio can be controlled throughout the reaction zone.

In the operation of thermal, exothermic, hydrodealkylation reactions, it is important to make efficient use of the heat evolved during the reaction. Therefore, it is also desirable that the heat evolved during the hydrodealkylation reaction be utilized to raise the temperature of the hydrodealkylation zone feed materials to the hydrodealkylation reaction temperature.

I have by my invention provided an improved hydrodealkylation process and apparatus therefor. I have by my invention provided an improved vaporous reaction method and apparatus therefor wherein efficient heat transfer is effected between the reaction effluent and the reaction feed material. I have by my invention provided an improved hydrodealkylation reactor.

Accordingly, it is an object of my invention to provide an improved reactor wherein the reactant feed material is vaporous.

Another object of my invention is to provide an improved hydrodealkylation process and apparatus therefor.

Another object of my invention is to provide an improved thermal hydrodealkylation process and apparatus therefor wherein carbon formation and deposition in the hydrodealkylation zone is minimized.

Other objects, advantages and features of my invention will be apparent to those skilled in the art upon the following discussion and the appended claims.

The inventive process is applicable to the vaporous hydrodealkylation of an alkylaromatic to produce an aromatic hydrocarbon wherein the feed to the hydrodealkylation zone comprises hydrogen and an alkylaromatic hydrocarbon. In a thermal hydrodealkylation process wherein an aromatic hydrocarbon is produced from an alkylaromatic hydrocarbon in the presence of iron, cobalt, nickel or an alloy containing at least one of said metals, the formation and deposition of carbon in the reactor is minimized when the hydrodealkylation reaction occurs in the presence of a sulfur compound, said sulfur compound vaporous at the hydrodealkylation temperature. Sulfur compounds that can be utilized include hydrogen sulfide, carbon disulfide and carbonyl sulfide. Preferably, but not to be limited thereto, the sulfur compound employed is substantially more volatile than the produced aromatic hydrocarbon in order that the sulfur compound can be readily separated from the hydrodealkylation zone effluent. Preferably, the concentration of sulfur in the hydrodealkylation zone is in the range from about 0.01 up to about 0.1 weight percent. Higher concentrations of sulfur can be employed but with increased concentrations it may be necessary to provide a sulfur removal process step to separate undesirable sulfur from the hydrodealkylation reaction product.

Figure 1:
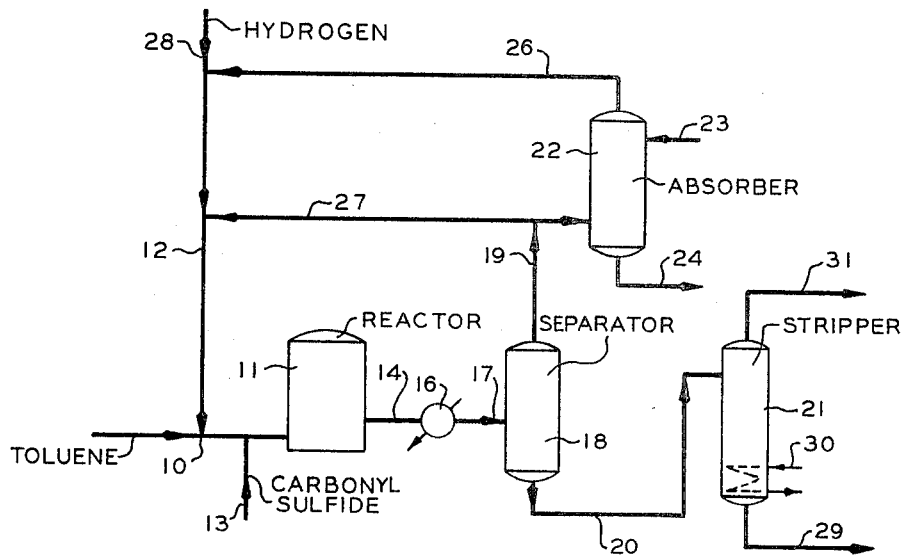
FIGURE 1 is a schematic representation of the inventive hydrodealkylation process.

A better understanding of the inventive process can be obtained by referring to FIGURE 1 of the drawing. The inventive process will hereinafter be discussed as applied specifically to the production of benzene from toluene, although it is not intended that the inventive process should be limited thereto. For purposes of illustration, the inventive process will be described as applied to the thermal hydrodealkylation of toluene wherein the sulfur compound employed is carbonyl sulfide.

A vaporous toluene feed stream is passed via conduit means 10 to reactor 11. The toluene feed is admixed with hydrogen passed to conduit 10 via conduit means 12 with the mol ratio of hydrogen to hydrocarbon maintained in the range of 2:1 to 8:1. A sulfur compound, carbonyl sulfide, is passed to conduit means 10 via conduit means 13 and admixed therein with the hydrogen-toluene mixture. The concentration of carbonyl sulfide in the hydrogen-toluene mixture passed to reactor 11 is maintained about 0.2 weight percent.

The production of benzene from toluene in reactor 11 is obtained by an exothermic non-catalytic hydrodealkylation reaction. However, in order to maintain a relatively high rate of reaction in reactor 11, it is within the scope of this invention to maintain the temperature of the feed reactants in the range of 900–1100° F. For example, the toluene feed stream can be preheated by passing at least a portion of the toluene feed stream through heat exchange means 16 in indirect heat exchange with the effluent from reactor 11 passed to heat exchange means 16 via conduit means 14. The temperature and pressure within reactor 11 is maintained within the range of 1200–1400° F. and 200–800 p.s.i.a., respectively.

A hydrodealkylation zone effluent comprising hydrogen, carbonyl sulfide, methane, benzene, and alkylbenzenes is withdrawn from reactor 11 via conduit means 14 and passed to a conventional heat exchange means 16. The effluent stream is partially condensed within heat exchange means 16 and the vaporous and liquid mixture passed from heat exchange means 16 via conduit means 17 to separator 18.

The temperature and pressure of separator 18 is maintained in the range of 100–300° F. and 150–700 p.s.i.a., respectively. A vaporous stream comprising hydrogen, methane and carbonyl sulfide is withdrawn from separator 18 via conduit means 19. A liquid product stream comprising benzene and alkylbenzenes is withdrawn from separator 18 via conduit means 20 and passed to a stripper 21.

To prevent the build-up of methane in reactor 11, at least a portion of the vaporous stream withdrawn from separator 18 is passed to a means of separating the methane from the hydrogen, such as absorber 22, via conduit means 19. Within absorber 22 the vaporous feed stream is countercurrently contacted with a lean absorption oil, such as kerosene, passed to absorber 22 via conduit means 23. When employing kerosene as an absorption oil, the lean oil to vaporous feed is maintained in a mol ratio of about 1:1. The temperature and pressure of absorber 22 is maintained in the range of 100–200° F. and in the range of 150–700 p.s.i.a., respectively. A hydrogen stream is withdrawn from absorber 22 via conduit means 26 and recycled to reactor 11 via conduit means 12 and conduit means 10.

The remainder of the vaporous stream withdrawn from separator 18 via conduit means 19 is recycled to reactor 11 via conduit means 27, conduit means 12 and conduit means 10.

The liquid stream withdrawn from separator 18 and passed via conduit means 20 to stripper 21 is introduced into the upper region of stripper 21. Stripper 21 is heated by a heat exchange means 30 positioned within the lower region of stripper 21. The temperature and pressure of stripper 21 is maintained in the range of about 100–200° F. and in the range of about 15–20 p.s.i.a., respectively. A vaporous methane stream is withdrawn from the upper region of stripper 21 via conduit means 31. A liquid product stream comprising benzene and alkylbenzenes is withdrawn from stripper 21 via conduit means 29. The product stream withdrawn from stripper 21 via conduit means 29 can be passed to a conventional fractionation zone for the separation of benzene from the heavier alkylbenzenes.

The hydrodealkylation of toluene to benzene is a highly exothermic reaction. It is desirable that the exothermic heat of reaction be quickly removed from the reaction zone, and in the interest of providing an economical process utilized to provide the heat required in another process step. It is also desirable to reduce to a minimum the hydrogen-hydrocarbon ratio required to effectuate the dealkylation reaction, thereby reducing to a minimum dealkylation reactor size and reducing to a minimum the cost of recovering the hydrogen from the dealkylation zone effluent and recycling the hydrogen to the dealkylation zone. It is therefore important to the hydrodealkylation process to provide a reactor wherein the average hydrogen-hydrocarbon ratio in the reaction zone is maximized for a particular hydrogen-hydrocarbon feed and wherein the exothermic heat of reaction is utilized in the hydrodealkylation process.

A maximum hydrogen-hydrocarbon ratio in the reaction zone for a fixed reaction zone inlet hydrogen-hydrocarbon ratio is provided by preventing recycle of the hydrodealkylation zone hydrocarbon effluent with the inlet feed. The removal of the exothermic heat of reaction and the utilization thereof in the hydrodealkylation process can be accomplished by indirect heat exchange between the hydrodealkylation zone effluent and the inlet feed to the hydrodealkylation zone.

Figure 2:
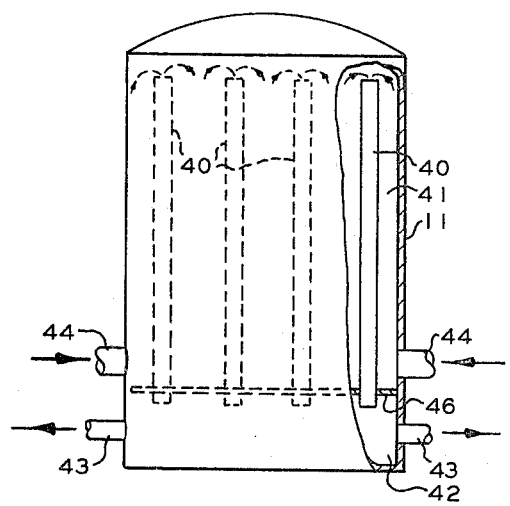
FIGURE 2 is a schematic elevation, partly in cross section, of the inventive reactor.

A reactor capable of providing a maximum hydrogen-hydrocarbon ratio in the reaction zone and of effectively utilizing the exothermic heat of reaction is illustrated in FIGURE 2. A toluene and hydrogen mixture is passed to reactor 11 via conduit inlet means 44. The sulfur compound is premixed with the hydrogen and toluene feed mixtures. The feed mixture flows upwardly through heat exchange zone 41 in indirect heat exchange with the exothermic reaction mixture within reactor tubes 40, thereby preheating the feed mixture. The preheated feed mixture passes downwardly through reactor tubes 40 in the indicated manner, flowing downwardly countercurrently to the flow of the reactant feed and in indirect heat exchange with said reactant feed. The hydrodealkylation zone effluent passes from heat exchange zone 41 into header 42 and from header 42 via conduit outlet means 43. Heat exchange zone 41 is separated from header 42 by a baffle means 46.

The hydrodealkylation reaction mixture flowing downwardly in indirect heat exchange with the upwardly flowing reactant feed preheats the upwardly flowing reactant feed to the reaction temperature, thereby utilizing the exothermic heat of reaction in an efficient manner. Utilizing the hydrodealkylation zone reaction mixture to preheat the reactant feed will permit the employment in another process step the quantity of heat conventionally required to preheat the hydrodealkylation zone feed.

Although four reactor tubes are herein illustrated, it is within the scope of this invention to increase or decrease the number of tubes. In order to reduce corrosion, carbon formation and deposition within the reactor tubes 40, the tubes 40 can be fabricated from ceramic materials or non-catalytic metallic alloys. However, reactor tubes fabricated from ceramic materials have relatively low heat transfer characteristics. Reactor 11 is so constructed and reactant feed rates so controlled that the hydrodealkylation reaction is substantially complete prior to the passage of the vaporous effluent from the bottom of reactor tubes 40.

It is within the scope of this invention to employ the inventive reactor in other processes wherein it is desired to effect a transfer of heat between the reactant feed and the reaction zone, and wherein it is desired to control the composition within the reaction zone.

The following example is presented as illustrative of the effectiveness of the inventive process. It is not, however, intended that the invention should be limited thereto.

EXAMPLE

A hydrocarbon feed mixture having the following composition:

| | Weight, percent |
|---|---|
| Toluene | 81.3 |
| Xylenes | 10.6 |
| $C_8$ naphthenes | 1.4 |
| $C_8$ paraffins | 5.2 |
| $C_9$ and $C_{10}$ aromatics | 1.3 |
| COS | 0.2 | is combined with hydrogen in the mol ratio of 1:4 and the combined mixture passed at the rate of 1.07 LHSV to the hydrodealkylation reactor of FIGURE 2 having a Type 310 stainless steel surface in contact with the reactant feed. The reactant feed is preheated to a temperature of 1000° F. and the temperature of the hydrodealkylation zone is maintained at 1260° F.

The hydrodealkylation zone effluent is of the following composition:

| | Weight, percent |
|---|---|
| Hydrogen | 5.4 |
| Methane | 17.5 |
| Ethane | 4.3 |
| Propane | 0.2 |
| Octanes | 0.0 |
| Benzene | 62.0 |
| Toluene | 6.6 |
| Xylenes | 0.1 |
| Heavies | 3.9 |

After an operational period of 95 hours, the process is discontinued and upon inspection of the hydrodealkylation reactor it is observed that the carbon formation and deposition within the hydrodealkylation reactor is 0.0018 weight percent of feed. When carbonyl sulfide is not employed in the feed to the hydrodealkylation zone, the formation and deposition of carbon in the hydrodealkylation zone is 4.0 weight percent of the feed. By employing carbonyl sulfide in the reactant feed, the formation and deposition of carbon has been substantially eliminated.

As will be evident to those skilled in the art, various modifications of this invention can be made, or followed, in the light of the foregoing disclosure and discussion without departing from the spirit or scope thereof.

I claim:

1. A hydrodealkylation process which comprises forming a mixture comprising a vaporous alkylaromatic and hydrogen, passing said mixture upwardly through a heat exchange zone, passing said mixture downwardly through a reaction zone in indirect heat exchange with said heat exchange zone, maintaining thermal hydrodealkylation process conditions within said reaction zone, passing heat from said reaction zone to said heat exchange zone, and withdrawing from said reaction zone an effluent product stream.

2. A hydrodealkylation process which comprises forming a mixture comprising a vaporous alkylaromatic, a vaporous sulfur compound and hydrogen, passing said mixture upwardly through a heat exchange zone, passing said mixture downwardly through a reaction zone in indirect heat exchange with said heat exchange zone, maintaining thermal hydrodealkylation process conditions within said reaction zone, passing heat from said reaction zone to said heat exchange zone, and withdrawing from said reaction zone an effluent product stream.

References Cited by the Examiner

UNITED STATES PATENTS

| | | | |
|---|---|---|---|
| 1,872,839 | 8/1932 | Snyder | 208—107 |
| 1,932,247 | 10/1933 | Kniskern | 23—289 |
| 1,990,877 | 2/1935 | Nelson | 208—106 |
| 2,168,840 | 8/1939 | Groll | 260—672 |
| 2,430,344 | 11/1947 | Kemp | 208—132 |
| 2,674,612 | 4/1954 | Murphree | 208—106 |
| 2,758,061 | 8/1956 | Geller | 208—106 |
| 2,929,775 | 3/1960 | Aristoff et al. | 260—672 |
| 3,149,176 | 9/1964 | Galzier et al. | 260—672 |

OTHER REFERENCES

Yukhnovsky: Ukrainskii Khem Zhurnal 3, No. 2, Technical Part, pp. 65–87 (1928). Cited in Chemical Abstracts, vol. 23, pp. 377–8 (1929). Translation available in 260–672 (36 pages of translation, pages 11 to 14 of translation particularly relied upon).

DELBERT E. GANTZ, *Primary Examiner.*

ALPHONSO D. SULLIVAN, *Examiner.*

J. E. DEMPSEY, C. R. DAVIS, *Assistant Examiners.*